(12) United States Patent
Tsutsumi et al.

(10) Patent No.: US 11,833,467 B2
(45) Date of Patent: Dec. 5, 2023

(54) BOILER PLANT AND CARBON DIOXIDE REMOVAL METHOD

(71) Applicants: MITSUBISHI HEAVY INDUSTRIES, LTD., Tokyo (JP); Mitsubishi Heavy Industries Engineering, Ltd., Kanagawa (JP)

(72) Inventors: Atsushi Tsutsumi, Yokohama (JP); Hiromi Ishii, Yokohama (JP); Tetsuya Tanaka, Yokohama (JP); Naoyuki Nagafuchi, Yokohama (JP); Takashi Kamijo, Yokohama (JP)

(73) Assignees: MITSUBISHI HEAVY INDUSTRIES, LTD., Tokyo (JP); MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 0 days.

(21) Appl. No.: 17/779,430

(22) PCT Filed: Dec. 7, 2020

(86) PCT No.: PCT/JP2020/045388
§ 371 (c)(1),
(2) Date: May 24, 2022

(87) PCT Pub. No.: WO2021/131629
PCT Pub. Date: Jul. 1, 2021

(65) Prior Publication Data
US 2022/0410062 A1 Dec. 29, 2022

(30) Foreign Application Priority Data
Dec. 27, 2019 (JP) .................... 2019-238846

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1412* (2013.01); *B01D 53/1475* (2013.01);
(Continued)

(58) Field of Classification Search
CPC ........... B01D 53/1425; B01D 53/1412; B01D 53/1475; B01D 53/18; B01D 2252/20478;
(Continued)

(56) References Cited

U.S. PATENT DOCUMENTS 8,613,794 B2 * 12/2013 Li .................. B01D 53/1418
95/227
2011/0232286 A1 9/2011 Mishima et al.
(Continued)

FOREIGN PATENT DOCUMENTS

JP 2011-208846 10/2011
JP 2012-516226 7/2012
(Continued)

OTHER PUBLICATIONS

International Search Report dated Jan. 26, 2021 in International (PCT) Application No. PCT/JP2020/045388.
(Continued)

*Primary Examiner* — Hoang M Nguyen
(74) *Attorney, Agent, or Firm* — Wenderoth, Lind & Ponack, L.L.P.

(57) ABSTRACT

A boiler plant includes a carbon dioxide capture system. The carbon dioxide capture system has an absorbing-liquid regeneration device and an absorber. The absorbing-liquid regeneration device includes a regenerator, a first circulation line in which the absorbing liquid is taken out from the
(Continued)

regenerator and is returned to the regenerator, and a second circulation line in which the absorbing liquid is taken out from the regenerator and is returned to the regenerator, a heat exchanger, a heater, and a switcher. The heat exchanger heats the absorbing liquid by exchanging heat between the absorbing liquid flowing through the first circulation line and steam from the boiler. The heater heats the absorbing liquid flowing in the second circulation line. The switcher switches between a first heating state, in which the absorbing liquid flows in the first circulation line, and a second heating state, in which the absorbing liquid flows in the second circulation line.

15 Claims, 3 Drawing Sheets

(51) Int. Cl.
   *F01K 11/02* (2006.01)
   *F23J 15/04* (2006.01)
   *F24H 1/00* (2022.01)
(52) U.S. Cl.
   CPC ............ *B01D 53/18* (2013.01); *F01K 11/02* (2013.01); *F23J 15/04* (2013.01); *B01D 2252/20478* (2013.01); *F23J 2215/50* (2013.01); *F24H 1/0018* (2013.01)
(58) Field of Classification Search
   CPC ...... B01D 2257/504; B01D 2258/0283; B01D 53/343; B01D 53/62; F01K 11/02; F01K 23/10; F23J 15/04; F23J 2215/50; F23J 2219/40; F24H 1/0018; Y02C 20/40; Y02E 20/16; Y02T 10/12
   See application file for complete search history.

(56) References Cited

U.S. PATENT DOCUMENTS

| | | | |
|---|---|---|---|
| 2011/0277479 A1 | 11/2011 | Richter et al. | |
| 2012/0219482 A1* | 8/2012 | Koss | B01D 53/1487 423/210 |
| 2012/0328501 A1* | 12/2012 | Iijima | B01D 53/1475 422/172 |
| 2014/0301927 A1 | 10/2014 | Udatsu et al. | |
| 2016/0151742 A1* | 6/2016 | Fujita | B01D 53/1475 422/170 |
| 2016/0166977 A1 | 6/2016 | Cullinane | |
| 2016/0263517 A1* | 9/2016 | Baek | B01D 53/1425 |
| 2018/0339265 A1 | 11/2018 | Elliott et al. | |
| 2020/0368674 A1 | 11/2020 | Tanaka et al. | |

FOREIGN PATENT DOCUMENTS

| | | |
|---|---|---|
| JP | 2015-104693 | 6/2015 |
| JP | 6158054 | 6/2017 |
| JP | 2019-76810 | 5/2019 |

OTHER PUBLICATIONS

Written Opinion of the International Searching Authority dated Jan. 26, 2021 in International (PCT) Application No. PCT/JP2020/045388.

* cited by examiner

BOILER PLANT AND CARBON DIOXIDE REMOVAL METHOD

TECHNICAL FIELD

The present invention relates to a boiler plant including a boiler and a carbon dioxide capture system for removing carbon dioxide contained in an exhaust gas from the boiler, and a carbon dioxide removal method for removing the carbon dioxide contained in the exhaust gas.

Priority is claimed on Japanese Patent Application No. 2019-238846 filed on Dec. 27, 2019, the content of which is incorporated herein by reference.

BACKGROUND ART

An exhaust gas containing carbon dioxide is discharged from a boiler that generates steam with the heat of a combustion gas generated through the combustion of fossil fuel. From the viewpoint of environmental protection, a technique for removing the carbon dioxide from the exhaust gas as much as possible is required. As such a technique, for example, the plant described in Japanese Unexamined Patent Application Publication No. 2015-104693 (hereinafter JP '693) is known.

The plant described in JP '693 has an absorber that absorbs carbon dioxide in an exhaust gas into an absorbing liquid and discharges the exhaust gas from which the carbon dioxide has been removed, and an absorbing-liquid regeneration device that separates the carbon dioxide from the absorbing liquid that has absorbed the carbon dioxide. The absorbing-liquid regeneration device includes a regenerator, a circulation line, and a heat exchanger (or reboiler). The regenerator allows the absorbing liquid, which has absorbed the carbon dioxide from the absorber, to flow thereinto, separates the carbon dioxide from the absorbing liquid in a high-temperature environment to exhaust the carbon dioxide, and returns the absorbing liquid from which the carbon dioxide has been separated to the absorber. The circulation line is a line that takes out the absorbing liquid from an inside of the regenerator and then returns the taken-out absorbing liquid to the inside of the regenerator. The heat exchanger (or reboiler) is provided in the circulation line to heat the absorbing liquid by exchanging heat between the absorbing liquid flowing through the circulation line and the steam. The plant further has a heat amount regulating unit that regulates the amount of heat input to the heat exchanger (or reboiler). The heat amount regulating unit specifically regulates the flow rate of the steam that is a target for heat exchange with the absorbing liquid.

The steam generated in the boiler may be used as the target for heat exchange with the absorbing liquid in the heat exchanger (or reboiler). In this case, if there is no the steam supply from the boiler, the absorbing liquid cannot be heated by the heat exchanger, and the temperature of the absorbing liquid in the regenerator and the heat exchanger cannot be raised. In a case where the temperature of the absorbing liquid in the regenerator and the heat exchanger is low, the carbon dioxide is not separated from the absorbing liquid in the regenerator, and the absorbing liquid is not regenerated. As a result, the carbon dioxide contained in the exhaust gas from the boiler cannot be removed unless the steam is supplied from the boiler.

In a general boiler, when fuel starts to be charged into the boiler, an exhaust gas containing carbon dioxide starts to be exhausted immediately from the boiler, while steam equal to or higher than a predetermined temperature and equal to or higher than a predetermined pressure is not generated immediately. Additionally, in a heat recovery system generator that generates steam by using the heat of the exhaust gas from a gas turbine, when the fuel starts to be charged into the gas turbine, the exhaust gas containing carbon dioxide starts to be exhausted immediately from the heat recovery system generator, while the steam equal to or higher than a predetermined temperature and equal to or higher than a predetermined pressure is not generated immediately. That is, in both a general boiler and a heat recovery system generator, there is a time lag between the start of exhaust of the exhaust gas and the start of generation of the steam equal to or higher than a predetermined temperature and equal to or higher than a predetermined pressure. For this reason, the absorbing liquid cannot be sufficiently heated by the heat exchanger for a predetermined time after the combustion gas starts to be exhausted from the boiler, and the carbon dioxide contained in the exhaust gas from the boiler cannot be removed.

Thus, an object of the present invention is to provide a boiler plant capable of reducing carbon dioxide in an exhaust gas exhausted from the plant even in the process of starting the boiler, and a carbon dioxide removal method.

Solution to Problem

A boiler plant as one aspect according to the invention for achieving the above object includes a boiler that generates steam with heat of a combustion gas generated through combustion of a fossil fuel, and a carbon dioxide capture system that removes carbon dioxide contained in an exhaust gas exhausted from the boiler.

The carbon dioxide capture system includes an absorbing-liquid regeneration device that separates the carbon dioxide from an absorbing liquid that has absorbed the carbon dioxide, and an absorber that allows the exhaust gas from the boiler to flow thereinto, absorbs the carbon dioxide in the exhaust gas in the absorbing liquid from the absorbing-liquid regeneration device, and discharges the exhaust gas from which the carbon dioxide has been removed. The absorbing-liquid regeneration device includes a regenerator that allows the absorbing liquid, which has absorbed the carbon dioxide in the absorber, to flow thereinto, separates the carbon dioxide from the absorbing liquid in a high-temperature environment to discharge the carbon dioxide, and returns the absorbing liquid from which the carbon dioxide has been separated to the absorber, a first circulation line that takes out the absorbing liquid from an inside of the regenerator and then returns the taken-out absorbing liquid to the inside of the regenerator, a second circulation line that takes out the absorbing liquid from the inside of the regenerator and then returns the taken-out absorbing liquid to the inside of the regenerator, a heat exchanger that is provided in the first circulation line to heat the absorbing liquid by exchanging heat between the absorbing liquid flowing through the first circulation line and the steam from the boiler, a heater that is provided in the second circulation line to heat the absorbing liquid flowing through the second circulation line, and a switcher that switches between a first heating state in which the absorbing liquid flows through the first circulation line and a second heating state in which the absorbing liquid flows through the second circulation line.

In the present aspect, when the steam condition that the temperature of the steam sent from the boiler to the heat exchanger is equal to or higher than a predetermined temperature and the pressure of the steam is equal to or higher than a predetermined pressure is satisfied, the absorbing-liquid regeneration device is brought into the first heating state. In the first heating state, the absorbing liquid is heated with the steam from the boiler in the heat exchanger. As the absorbing liquid is heated, the inside of the regenerator becomes a high-temperature environment, and the carbon dioxide is separated from the absorbing liquid. The absorbing liquid from which the carbon dioxide has been separated is supplied to the absorber. In the absorber, the carbon dioxide in the exhaust gas from the boiler is absorbed by the absorbing liquid, and the exhaust gas from which the carbon dioxide has been removed is discharged. Thus, in the present aspect, when the steam from the boiler satisfies the steam condition, the carbon dioxide contained in the exhaust gas exhausted from the plant can be reduced.

In the present aspect, the absorbing-liquid regeneration device is brought into the second heating state when the steam sent from the boiler to the heat exchanger does not satisfy the steam condition (the temperature of the steam sent from the boiler to the heat exchanger is equal to or higher than a predetermined temperature and the pressure of the steam is equal to or higher than a predetermined pressure), for example, in the process of stopping or starting the boiler. In the second heating state, the absorbing liquid is heated by the heater. As the absorbing liquid is heated, the inside of the regenerator becomes a high-temperature environment, and the carbon dioxide is separated from the absorbing liquid. The absorbing liquid from which the carbon dioxide has been separated is supplied to the absorber. In the absorber, the carbon dioxide in the exhaust gas from the boiler is absorbed by the absorbing liquid, and the exhaust gas from which the carbon dioxide has been removed is discharged. Additionally, in the present aspect, even when the second heating state is switched to the first heating state, the temperature of the absorbing liquid in the regenerator is equal to or higher than the predetermined temperature, so that the second heating state is switched to the first heating state. Even immediately after that, the temperature of the absorbing liquid in the regenerator can be raised to the target temperature in a short time, and the carbon dioxide contained in the exhaust gas exhausted from the plant can be reduced.

A carbon dioxide removal method as one aspect according to the invention for achieving the above object includes an absorbing-liquid regeneration step in which carbon dioxide is separable from an absorbing liquid that has absorbed the carbon dioxide, and an absorption step in which the exhaust gas from the boiler flows in, the carbon dioxide in the exhaust gas is absorbed in the absorbing liquid processed in the absorbing-liquid regeneration step, and the exhaust gas from which the carbon dioxide has been removed is capable of being discharged.

The absorbing-liquid regeneration step is executed by the absorbing-liquid regeneration device. The absorbing-liquid regeneration device includes a regenerator that allows the absorbing liquid, which has absorbed the carbon dioxide through the execution of the absorption step, to flow thereinto, separates the carbon dioxide from the absorbing liquid in a high-temperature environment to discharge the carbon dioxide, and causes the absorbing liquid from which the carbon dioxide has been separated to be used in the absorption step, a first circulation line that takes out the absorbing liquid from an inside of the regenerator and then returns the taken-out absorbing liquid to the inside of the regenerator, a second circulation line that takes out the absorbing liquid from the inside of the regenerator and then returns the taken-out absorbing liquid to the inside of the regenerator, a heat exchanger that is provided in the first circulation line to heat the absorbing liquid by exchanging heat between the absorbing liquid flowing through the first circulation line and the steam from the boiler, and a heater that is provided in the second circulation line to heat the absorbing liquid flowing through the second circulation line. The absorbing-liquid regeneration step includes a first heating step in which the absorbing liquid flows through the first circulation line such that the absorbing liquid is heatable by the heat exchanger, and a second heating step in which the absorbing liquid flows through the second circulation line such that the absorbing liquid is heatable by the heater.

Advantageous Effects of Invention

According to one aspect of the present invention, the carbon dioxide in the exhaust gas exhausted from the plant can be reduced even in the process of starting the boiler.

DESCRIPTION OF EMBODIMENTS

Hereinafter, an embodiment and a modification example of the boiler plant according to the present invention will be described below with reference to the drawings.

Embodiment

A boiler plant of the present embodiment will be described with reference to FIGS. 1 to 3.

Figure 1:
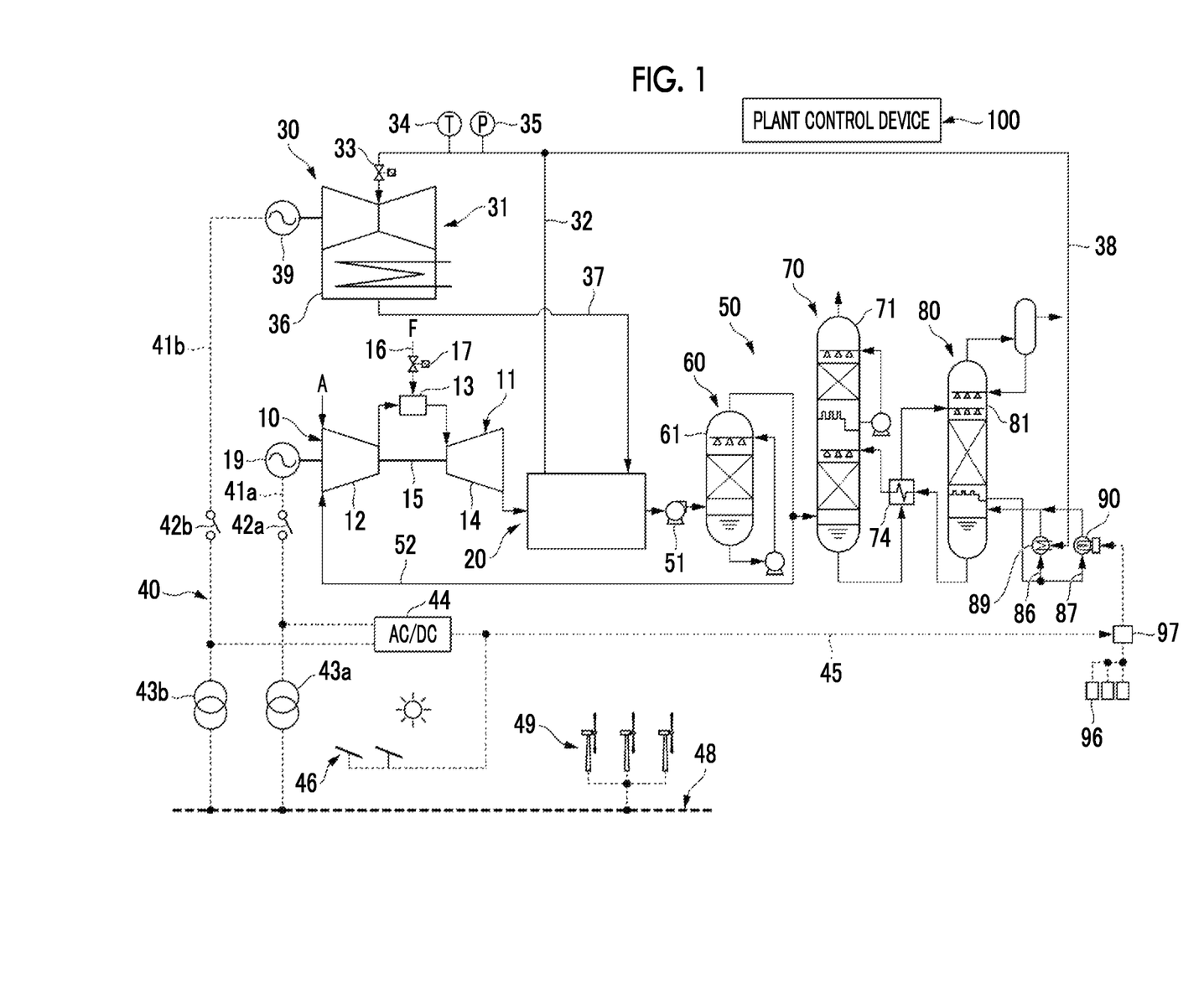
FIG. 1 is a system diagram of a boiler plant according to an embodiment of the present invention.

As shown in FIG. 1, the boiler plant of the present embodiment includes gas turbine equipment 10, a heat recovery system generator 20, steam turbine equipment 30, a power system facility 40, a carbon dioxide capture system 50, and a plant control device 100.

The gas turbine equipment 10 includes a gas turbine 11, a fuel line 16 that guides fuel (fossil fuel) F to the gas turbine 11, a fuel regulating valve 17 that regulates the flow rate of the fuel F flowing through the fuel line 16, and a GT generator 19 that generates power by driving the gas turbine 11. Since the gas turbine equipment 10 includes the GT generator 19 as described above, the gas turbine equipment is also a gas turbine power generation facility.

The gas turbine 11 includes an air compressor 12 that compresses air A to generate compressed air, a combustor 13 that combusts the fuel F in the compressed air to generate combustion gas, and a turbine 14 driven with the combustion gas. The air compressor 12 has a compressor rotor, and a compressor casing that covers the compressor rotor. The turbine 14 has a turbine rotor, and a turbine casing that covers the turbine rotor. The compressor rotor and the turbine rotor are coupled to each other to form a gas turbine rotor 15. The fuel line 16 is connected to the combustor 13. The fuel line 16 is provided with the fuel regulating valve 17.

The heat recovery system generator 20 heats water with the heat of exhaust gas from the gas turbine 11 and turns the water into steam.

The steam turbine equipment 30 includes a steam turbine 31 driven with the steam generated by the heat recovery system generator 20, a main steam line 32 that guides the steam generated by the heat recovery system generator 20 to the steam turbine 31, a steam regulating valve 33 that regulates the flow rate of the steam flowing into the steam turbine 31 from the main steam line 32, a temperature sensor 34 that detects the temperature of the steam flowing through the main steam line 32, a pressure sensor 35 that detects the pressure of the steam flowing through the main steam line 32, a condenser 36 that returns the steam exhausted from the steam turbine 31 to water, a supply water line 37 that guides the water in the condenser 36 to the heat recovery system generator 20, and an ST generator 39 that generates power by driving the steam turbine 31. As described above, since the steam turbine equipment 30 includes the ST generator 39, the steam turbine equipment 30 is also a steam turbine power generation facility.

The power system facility 40 includes a GT power system 41a that electrically connects the GT generator 19 to an external power system 48, a GT circuit breaker 42a provided in the GT power system 41a, a GT transformer 43a provided in the GT power system 41a, an ST power system 41b that electrically connects the ST generator 39 to the external power system 48, an ST circuit breaker 42b provided in the ST power system 41b, an ST transformer 43b provided in the ST power system 41b, an AC/DC converter 44 that converts alternating-current power flowing through the GT power system 41a and the ST power system 41b into direct-current power, a direct-current power system 45 connected to the AC/DC converter 44, and a solar power generation facility 46 connected to the direct-current power system 45. The solar power generation facility 46 includes a plurality of solar cells.

Additionally, a plurality of power generation facilities are electrically connected to the external power system 48. One power generation facility of the plurality of power generation facilities is a wind power generation facility 49. The wind power generation facility 49 includes a windmill. Both the solar power generation facility 46 and the wind power generation facility 49 are carbon-free power generation facilities. The carbon-free power generation facility is a facility that generates power by using the combustion gas generated through the combustion of the fossil fuel, for example, a facility that discharges carbon dioxide having a concentration lower than the carbon dioxide concentration in the exhaust gas from the gas turbine power generation facility 10 of the present embodiment or a facility that does not discharge the carbon dioxide during power generation. Additionally, the solar power generation facility 46 and the wind power generation facility 49 are both facilities that generate power by using renewable energy.

The plant control device 100 controls the opening and closing of the fuel regulating valve 17 and the steam regulating valve 33.

The carbon dioxide capture system 50 includes a gas booster 51, an exhaust gas cooling device 60, an absorber 70, an absorbing-liquid regeneration device 80, and an exhaust gas recirculation line 52.

Figure 2:
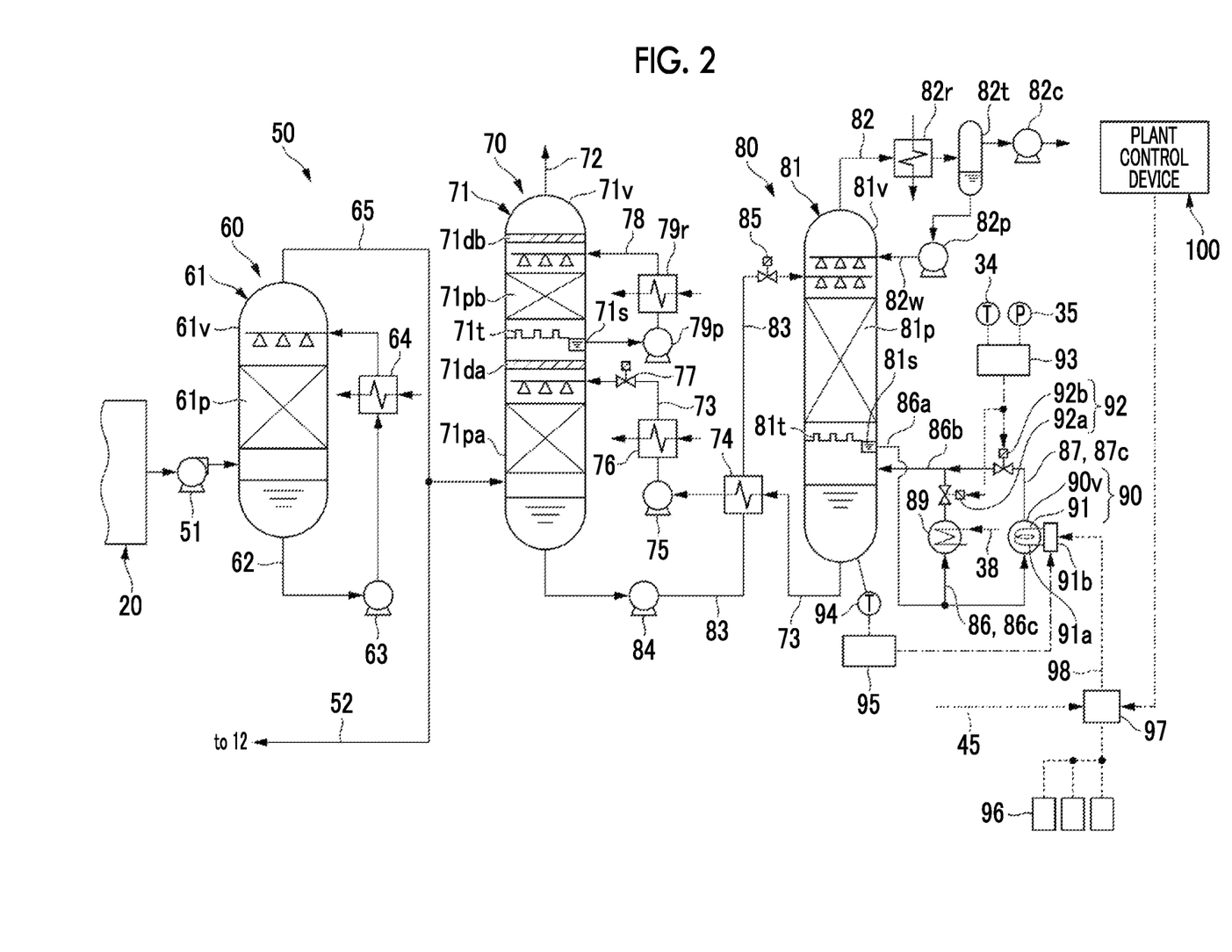
FIG. 2 is a system diagram of a carbon dioxide capture system according to the embodiment of the present invention.

As shown in FIG. 2, the gas booster 51 boosts the pressure of the exhaust gas from the heat recovery system generator 20 to send the boosted exhaust gas to the exhaust gas cooling device 60. The exhaust gas cooling device 60 cools the exhaust gas from the gas booster 51. The exhaust gas cooling device 60 includes a cooling tower 61, a water circulation line 62, a water circulation pump 63, a water cooler 64, and a low-temperature exhaust gas line 65.

The cooling tower 61 has a cooling tower container 61v and a filling material 61p disposed in an intermediate portion in the vertical direction in the cooling tower container 61v. The exhaust gas from the gas booster 51 is supplied to a position below a filling material 61p in the cooling tower container 61v. One end of the water circulation line 62 is connected to a lower end of the cooling tower container 61v, and the other end of the water circulation line 62 is connected to a position above the filling material 61p in the cooling tower container 61v. The water circulation pump 63 and the water cooler 64 are provided in the water circulation line 62. The water reserved at a bottom portion of the cooling tower container 61v flows into the water circulation pump 63 via the water circulation line 62. The water circulation pump 63 boosts the pressure of the water to send the boosted water to an upper portion in the cooling tower container 61v via the water circulation line 62. As a result, the water is sprayed into an upper space in the cooling tower container 61v. The water cooler 64 is a heat exchanger that cools the water by exchanging heat between the water flowing through the water circulation line 62 and a cooling medium. As the cooling medium, for example, cooling water is used. One end of the low-temperature exhaust gas line 65 is connected to an upper end of the cooling tower container 61v.

One end of the exhaust gas recirculation line 52 is connected to the low-temperature exhaust gas line 65. Additionally, the other end of the exhaust gas recirculation line 52 is connected to a suction port of the air compressor 12 in the gas turbine equipment 10. In addition, the aforementioned gas booster 51 may be provided in the low-temperature exhaust gas line 65.

The absorber 70 absorbs the carbon dioxide contained in the exhaust gas from the exhaust gas cooling device 60 into an absorbing liquid, and discharges the exhaust gas from which the carbon dioxide has been removed. The absorber 70 includes an absorption tower 71, an exhaust line 72, a lean absorbing-liquid line 73, a lean-rich heat exchanger 74, a lean absorbing-liquid pump 75, a lean absorbing-liquid cooler 76, a lean absorbing-liquid regulating valve 77, a rinse water circulation line 78, a rinse water circulation pump 79p, and a rinse water cooler 79r.

The absorption tower 71 has an absorption tower container 71v, a lower filling material 71pa, an upper filling material 71pb, a lower demister 71da, an upper demister 71db, and a tray 71t. The lower filling material 71pa, the upper filling material 71pb, the lower demister 71da, the upper demister 71db, and the tray 71t are all disposed in the absorption tower container 71v. The lower filling material 71pa is disposed at a distance downward with respect to the upper filling material 71pb. The lower demister 71da is disposed in the vertical direction between the lower filling material 71pa and the upper filling material 71pb. The upper demister 71db is disposed above the upper filling material 71pb. Both the lower demister 71da and the upper demister 71db capture the moisture contained in the gas rising from the bottom to the top and suppress the rise of the moisture above themselves. The tray 71t is disposed in the vertical direction between the lower demister 71da and the upper filling material 71pb. The tray 71t is formed with a plurality of through-holes penetrating in the vertical direction and a water reservoir portion 71s in which the rinse water is reserved.

The other end of the aforementioned low-temperature exhaust gas line 65 is connected to a position below the lower filling material 71pa in the absorption tower container 71v. The exhaust line 72 is connected to an upper end of the absorption tower container 71v. The exhaust gas that has passed through the absorption tower container 71v flows through the exhaust line 72. The exhaust gas is exhausted to the outside of the plant via a chimney or the like.

One end of the rinse water circulation line 78 is connected to the water reservoir portion 71s in the absorption tower container 71v, and the other end of the rinse water circulation line 78 is connected to a position above the upper filling material 71pb and below the upper demister 71db, in the absorption tower container 71v. Both the rinse water circulation pump 79p and the rinse water cooler 79r are provided in the rinse water circulation line 78. The rinse water circulation pump 79p boosts the pressure of the rinse water flowing into the rinse water circulation line 78. The rinse water cooler 79r cools the rinse water that has flowed into the rinse water circulation line 78.

A lean absorbing liquid flows through the lean absorbing-liquid line 73. The lean absorbing liquid is an absorbing liquid that absorbs a small amount of carbon dioxide. Additionally, the rich absorbing liquid is an absorbing liquid that absorbs a large amount of carbon dioxide. The absorbing liquid is an amine-based absorbing liquid. Specifically, as the absorbing liquid, for example, alkanolamines such as monoethanolamine, diethanolamine, triethanolamine, methyldiethanolamine, diisopropanolamine, and diglycolamine can be adopted. Additionally, hindered amines can also be adopted. Additionally, each of these single aqueous solutions or mixed aqueous solutions of two or more of these can also be adopted. One end of the lean absorbing-liquid line 73 is connected to a position above the lower filling material 71pa and below the lower demister 71da, in the absorption tower container 71v. For this reason, the lean absorbing liquid that has flowed through the lean absorbing-liquid line 73 is sprayed in an intermediate space between the lower filling material 71pa and the lower demister 71da in the absorption tower container 71v.

The lean-rich heat exchanger 74, the lean absorbing-liquid pump 75, the lean absorbing-liquid cooler 76, and the lean absorbing-liquid regulating valve 77 are all provided in the lean absorbing-liquid line 73. The lean-rich heat exchanger 74 heats the rich absorbing liquid while cooling the lean absorbing liquid by exchanging heat between the lean absorbing liquid and the rich absorbing liquid. The lean absorbing-liquid pump 75 boosts the pressure of the lean absorbing liquid flowing through the lean absorbing-liquid line 73. The lean absorbing-liquid cooler 76 is a heat exchanger that cools the lean absorbing liquid by exchanging heat between the lean absorbing liquid boosted by the lean absorbing-liquid pump 75 and the cooling medium. As the cooling medium, for example, cooling water is used. The lean absorbing-liquid regulating valve 77 regulates the flow rate of the lean absorbing liquid.

The absorbing-liquid regeneration device 80 separates the carbon dioxide from the absorbing liquid that has absorbed the carbon dioxide from the absorber 70, that is, the rich absorbing liquid. The absorbing-liquid regeneration device 80 has a regenerator 81, a carbon dioxide recovery line 82, a cooler 82r, a moisture separation tank 82t, a carbon dioxide compressor 82c, a water pump 82p, a moisture recovery line 82w, a rich absorbing-liquid line 83, a rich absorbing-liquid pump 84, a rich absorbing-liquid regulating valve 85, a first circulation line 86, a second circulation line 87, a reboiler (heat exchanger) 89, a heater 90, a switcher 92, a switching controller 93, a temperature sensor 94, a second heating controller 95, a secondary battery 96, a charging and discharging controller 97, and a discharge system 98.

The regenerator 81 has a regenerator container 81v, a filling material 81p disposed at an intermediate portion in the vertical direction in the regenerator container 81v, and a tray 81t disposed under the filling material 81p in the regenerator container 81v. The tray 81t is formed with a plurality of through-holes penetrating in the vertical direction and a liquid reservoir portion 81s in which the absorbing liquid is reserved. The other end of the aforementioned lean absorbing-liquid line 73 is connected to a lower end of the regenerator container 81v.

The carbon dioxide recovery line 82 is connected to an upper end of the regenerator container 81v. A gas containing carbon dioxide flowing out of the regenerator container 81v flows through the carbon dioxide recovery line 82. The cooler 82r, the moisture separation tank 82t, and the carbon dioxide compressor 82c are provided in the carbon dioxide recovery line 82. The cooler 82r cools the gas containing carbon dioxide flowing out from the regenerator container 81v. The moisture separation tank 82t separates the moisture contained in this gas. The carbon dioxide compressor 82c compresses the gas from which most of the moisture has been removed. One end of the moisture recovery line 82w is connected to a lower end of the moisture separation tank 82t. The other end of the moisture recovery line 82w is connected to a position above the filling material 81p in the regenerator container 81v. For this reason, the water reserved in the moisture separation tank 82t is sprayed into an upper space in the regenerator container 81v. The water pump 82p is provided on the moisture recovery line 82w. The gas compressed by the carbon dioxide compressor 82c is sent to, for example, a carbon dioxide liquefaction facility where the gas is liquefied.

One end of the rich absorbing-liquid line 83 is connected to a lower end of the aforementioned absorption tower container 71v, and the other end of the rich absorbing-liquid line 83 is connected to a position above the filling material 81p in the regenerator container 81v and below a connection position of the moisture recovery line 82w with respect to the regenerator container 81v. For this reason, the rich absorbing liquid from the rich absorbing-liquid line 83 is sprayed into the upper space in the regenerator container 81v. The rich absorbing-liquid pump 84 and the rich absorbing-liquid regulating valve 85 are provided in the rich absorbing-liquid line 83. The rich absorbing-liquid pump 84 boosts the pressure of the rich absorbing liquid flowing through the rich absorbing-liquid line 83. The rich absorbing-liquid regulating valve 85 regulates the flow rate of the rich absorbing liquid. Additionally, the aforementioned lean-rich heat exchanger 74 is provided in the rich absorbing-liquid line 83. Thus, the lean-rich heat exchanger 74 exchanges heat between the lean absorbing liquid flowing through the lean absorbing-liquid line 73 and the rich absorbing liquid flowing through the rich absorbing-liquid line 83.

One end of the first circulation line 86 is connected to the liquid reservoir portion 81s in the regenerator container 81v, and the other end of the first circulation line 86 is connected to a position below the liquid reservoir portion 81s in the regenerator container 81v. The first circulation line 86 has an inflow-side sharing portion 86a including the aforementioned one end, an outflow-side sharing portion 86b including the aforementioned other end, and an intermediate portion 86c between the inflow-side sharing portion 86a and the outflow-side sharing portion 86b. A reboiler (heat exchanger) 89 is provided in the intermediate portion 86c in the first circulation line 86. A heating steam line 38 (refer to FIG. 1) branching from the main steam line 32 of the steam turbine equipment 30 is connected to the reboiler 89. The reboiler 89 heats the absorbing liquid by exchanging heat between the absorbing liquid flowing through the intermediate portion 86c and the steam from the heating steam line 38.

The second circulation line 87 has an inflow-side sharing portion 86a of the first circulation line 86, an outflow-side sharing portion 86b of the first circulation line 86, and an intermediate portion 87c between the inflow-side sharing portion 86a and the outflow-side sharing portion 86b. That is, the first circulation line 86 and the second circulation line 87 share an inflow-side portion and an outflow-side portion with each other. The intermediate portion 87c of the second circulation line 87 is independent of the intermediate portion 86c of the first circulation line 86. The heater 90 is provided in the intermediate portion 87c of the second circulation line 87. The heater 90 has a heating container 90v into which the absorbing liquid flowing through the intermediate portion 87c of the second circulation line 87 flows, and an electric heater 91 that heats the absorbing liquid in the heating container 90v. The electric heater 91 has an electric heater main body 91a that is a heat generating body, and a heater drive circuit 91b that supplies power to the electric heater main body 91a.

The switcher 92 has a first shut-off valve 92a provided in the intermediate portion 86c of the first circulation line 86 and a second shut-off valve 92b provided in the intermediate portion 87c of the second circulation line 87.

The switching controller 93 controls the opening and closing of the first shut-off valve 92a and the second shut-off valve 92b depending on the steam temperature detected by the temperature sensor 34 of the steam turbine equipment 30 and the steam pressure detected by the pressure sensor 35 of the steam turbine equipment 30. As the switching controller 93 controls the opening and closing of the first shut-off valve 92a and the second shut-off valve 92b, it is possible to realize a first heating state in which the absorbing liquid is allowed to flow through the first circulation line 86 and the absorbing liquid can be heated by the reboiler 89 and a second heating state in which the absorbing liquid is allowed to flow through the second circulation line 87 and the absorbing liquid can be heated by the heater 90. The switching controller 93 instructs the switcher 92 to bring about the first heating state when the steam condition that the temperature of the steam sent from the heat recovery system generator 20 to the reboiler 89 is equal to or higher than a predetermined temperature Ts and the pressure of the steam is equal to or higher than a predetermined pressure is satisfied. Additionally, the switching controller 93 instructs the switcher 92 to bring about the second heating state when the steam sent from the heat recovery system generator 20 to the reboiler 89 does not satisfy the steam condition. In a case where the first heating state is realized, the switching controller 93 gives an opening instruction to the first shut-off valve 92a and gives a closing instruction to the second shut-off valve 92b. Additionally, in a case where the second heating state is realized, the switching controller 93 gives a closing instruction to the first shut-off valve 92a and gives an opening instruction to the second shut-off valve 92b. In addition, here, the switcher 92 is constituted by the first shut-off valve 92a and the second shut-off valve 92b, but the switcher 92 can also be constituted by one three-way valve. In this case, the three-way valve is provided at a connection portion between the intermediate portion 86c of the first circulation line 86 and the intermediate portion 87c of the second circulation line 87.

The temperature sensor 94 is provided at a bottom portion of the regenerator container 81v. The temperature sensor 94 detects the temperature of the absorbing liquid reserved at a bottom portion in the regenerator container 81v.

The second heating controller 95 controls the heating in the heater 90 depending on the absorbing liquid temperature detected by the temperature sensor 94. Specifically, an ON instruction or an OFF instruction is given to the heater drive circuit 91b depending on the absorbing liquid temperature.

The discharge system 98 electrically connects the heater drive circuit 91b to the charging and discharging controller 97. The direct-current power system 45 and the secondary battery 96 are further electrically connected to the charging and discharging controller 97. The charging and discharging controller 97 charges the secondary battery 96 with the direct-current power from the direct-current power system 45 or discharges power from the secondary battery 96 depending on a state signal from the plant control device 100.

Next, the operation of the boiler plant described above will be described.

First, the operation of the boiler plant when the gas turbine 11, the steam turbine 31, and the heat recovery system generator 20 are in steady operation will be described.

When the gas turbine 11 is in steady operation, the gas turbine rotor 15 is rotating at a rated rotation speed. In this case, the air compressor 12 compresses the air to generate compressed air. The compressed air flows into the combustor 13. The fuel F is supplied to the combustor 13. The combustor 13 combusts the fuel F in the compressed air to generate a combustion gas. The turbine 14 is driven by the combustion gas. By driving the turbine 14, the GT generator 19 generates power. The power generated by the GT generator 19 is supplied to the external power system 48 via the GT circuit breaker 42a and the GT transformer 43a in the closed state.

The exhaust gas exhausted from the gas turbine 11 flows into the heat recovery system generator 20. The heat recovery system generator 20 generates steam by using the heat of the exhaust gas. When the heat recovery system generator 20 is in steady operation, steam at a predetermined temperature or higher and a predetermined pressure or higher is generated in a predetermined amount or higher.

When the steam turbine 31 is in steady operation, the steam turbine rotor is rotating at a rated rotation speed. The ST generator 39 generates power by rotating the steam turbine rotor. The power generated by the ST generator 39 is supplied to the external power system 48 via the ST circuit breaker 42b and the ST transformer 43b in the closed state.

The exhaust gas exhausted from the heat recovery system generator 20 flows into the carbon dioxide capture system 50. The exhaust gas boosted by the gas booster 51 flows into the cooling tower 61 of the exhaust gas cooling device 60 in the carbon dioxide capture system 50. In the cooling tower 61, the exhaust gas is cooled to, for example, about 40° C. A part of the exhaust gas cooled in the cooling tower 61 flows into a lower space in the absorption tower container 71v via the low-temperature exhaust gas line 65. In this way, the reason why the exhaust gas is cooled is that the carbon dioxide is easily absorbed by the absorbing liquid. Additionally, the other part of the exhaust gas cooled in the cooling tower 61 flows into the air compressor 12 of the gas turbine 11 via the low-temperature exhaust gas line 65 and the exhaust gas recirculation line 52. Thus, the air compressor 12 compresses not only the outside air but also the exhaust gas cooled in the cooling tower 61. The exhaust gas flows into the heat recovery system generator 20 again via the combustor 13 and the turbine 14. For this reason, the carbon dioxide concentration in the exhaust gas exhausted from the heat recovery system generator 20, in other words, the exhaust gas flowing into the carbon dioxide capture system 50 becomes high.

As described above, the carbon dioxide capture system 50 removes carbon dioxide from the exhaust gas having a high carbon dioxide concentration. For this reason, in the present embodiment, the carbon dioxide removal efficiency in the carbon dioxide capture system 50 can be enhanced.

The exhaust gas that has flowed into the lower space in the absorption tower container 71v rises in the absorption tower container 71v. Additionally, in the intermediate space between the lower filling material 71pa and the lower demister 71da in the absorption tower container 71v, for example, a lean absorbing liquid at 40° C. is sprayed from the lean absorbing-liquid line 73. The lean absorbing liquid descends in the absorption tower container 71v. In the descending process, the lean absorbing liquid comes into contact with the exhaust gas and absorbs the carbon dioxide in the exhaust gas. The lean absorbing liquid becomes a rich absorbing liquid by absorbing the carbon dioxide and is temporarily reserved at a bottom portion in the absorption tower container 71v. Meanwhile, the exhaust gas from which the carbon dioxide has been removed by the contact with the lean absorbing liquid rises and passes through the lower demister 71da. The moisture contained in the exhaust gas is removed in the process of passing through the lower demister 71da. The exhaust gas passes through the through-holes of the tray 71t and further rises. The water reserved in the water reservoir portion 71s of the tray 71t is boosted and cooled via the rinse water circulation pump 79p and the rinse water cooler 79r, and then enters a space above the upper filling material 71pb in the absorption tower container 71v and is sprayed as rinse water. The exhaust gas that has passed through the tray 71t comes into contact with the rinse water and is cooled in the process of passing through the upper filling material 71pb. A part of the rinse water is reserved in the water reservoir portion 71s of the tray 71t. Additionally, the rest of the rinse water passes through the tray 71t and is temporarily reserved as a part of the lean absorbing liquid at the bottom portion in the absorption tower container 71v. The exhaust gas cooled with the rinse water passes through the upper demister 71db. The moisture contained in the exhaust gas is removed in the process of passing through the upper demister 71db. The exhaust gas from which the carbon dioxide and the moisture have been removed is exhausted to the outside of the plant via the exhaust line 72.

The rich absorbing liquid reserved at the bottom portion in the absorption tower container 71v flows into the rich absorbing-liquid line 83. The rich absorbing liquid is boosted by the rich absorbing-liquid pump 84 in the process of flowing through the rich absorbing-liquid line 83, and then heated by heat exchange with the lean absorbing liquid in the lean-rich heat exchanger 74. The heated rich absorbing liquid is sprayed into the upper space in the regenerator container 81v via the rich absorbing-liquid regulating valve 85.

The rich absorbing liquid sprayed into the upper space in the regenerator container 81v is heated in contact with the steam in the regenerator container 81v, and the carbon dioxide in the rich absorbing liquid is separated. The carbon dioxide is sent to, for example, the carbon dioxide liquefaction facility via the carbon dioxide recovery line 82. The rich absorbing liquid becomes a lean absorbing liquid as the carbon dioxide is separated. A part of the lean absorbing liquid is reserved in the liquid reservoir portion 81s of the tray 81t. Additionally, the rest of the lean absorbing liquid is temporarily reserved at the bottom portion in the regenerator container 81v through the through-hole of the tray 81t.

The lean absorbing liquid reserved in the liquid reservoir portion 81s in the regenerator container 81v flows into the reboiler 89 via the first circulation line 86. A part of the steam generated in the heat recovery system generator 20 flows into the reboiler 89 via the heating steam line 38. In the reboiler 89, the lean absorbing liquid is heated to, for example, 120° C. by heat exchange between the lean absorbing liquid and the steam. The lean absorbing liquid heated by the reboiler 89 flows into the regenerator container 81v via the first shut-off valve 92a in the open state. A part of the lean absorbing liquid becomes the steam in the regenerator container 81v and rises in the regenerator container 81v. Additionally, the rest of the lean absorbing liquid descends in the regenerator container 81v and is temporarily reserved at the bottom portion of the regenerator container 81v.

The lean absorbing liquid reserved at the bottom portion in the regenerator container 81v flows into the lean absorbing-liquid line 73. The lean absorbing liquid is cooled by heat exchange with the rich absorbing liquid in the lean-rich heat exchanger 74 in the process of flowing through the lean absorbing-liquid line 73, and then boosted by the lean absorbing-liquid pump 75. After that, the lean absorbing liquid is cooled to, for example, the aforementioned 40° C. by the lean absorbing-liquid cooler 76, and then sprayed into an upper space in the absorption tower container 71v via the lean absorbing-liquid regulating valve 77.

Figure 3:
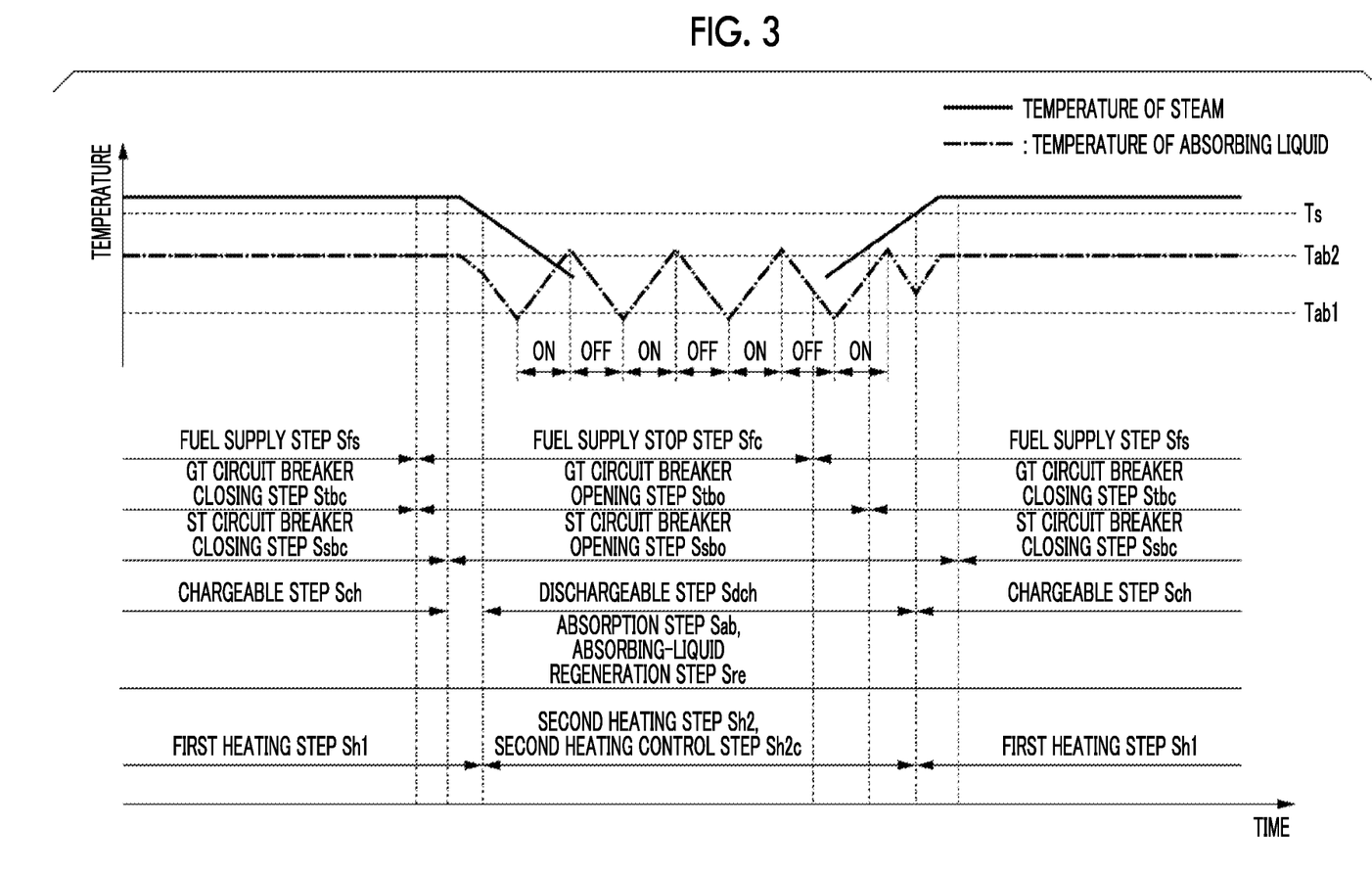
FIG. 3 is a timing chart showing the execution timings of a plurality of steps executed by the boiler plant according to the embodiment of the present invention.

As shown in FIG. 3, when the gas turbine 11, the steam turbine 31, and the heat recovery system generator 20 described above are in steady operation, a fuel supply step Sfs, a GT circuit breaker closing step Stbc, an ST circuit breaker closing step Ssbc, a chargeable step Sch, the absorption step Sab, an absorbing-liquid regeneration step Sre, and a first heating step Sh1 are executed.

In the fuel supply step Sfs, fuel is supplied to the combustor 13 of the gas turbine 11. For this reason, during the fuel supply step Sfs, combustion gas is generated, and the combustion gas flows into the carbon dioxide capture system 50 as the exhaust gas via the heat recovery system generator 20. In the GT circuit breaker closing step Stbc, the GT circuit breaker 42a is closed, the GT generator 19 generates power, and the power in this case is supplied to the external power system 48. In the ST circuit breaker closing step Ssbc, the ST circuit breaker 42b is closed, the ST generator 39 generates power, and the power in this case is supplied to the external power system 48. In the chargeable step Sch, the direct-current power system 45 and the secondary battery 96 are brought into an electrically connected state via the charging and discharging controller 97. For this reason, a chargeable state is brought about in which a part of the power from the GT generator 19, the ST generator 39, the solar power generation facility 46, and the wind power generation facility 49 electrically connected to the direct-current power system 45 is chargeable into the secondary battery 96 via the charging and discharging controller 97. In the chargeable state, if the secondary battery 96 is not in a fully charged state, a part of the alternating-current power from the GT generator 19, the ST generator 39, and the wind power generation facility 49 may be converted into direct-current power by the AC/DC converter 44 and then charged into the secondary battery 96 via the direct-current power system 45 and the charging and discharging controller 97. Additionally, in the chargeable state, if the secondary battery 96 is not in the fully charged state, a part of the direct-current power from the solar power generation facility 46 may be charged into the secondary battery 96 via the direct-current power system 45 and the charging and discharging controller 97.

In the absorption step Sab, the carbon dioxide capture system 50 absorbs the carbon dioxide contained in the exhaust gas exhausted from the heat recovery system generator 20 into the lean absorbing liquid, and brings about a state in which the exhaust gas from which the carbon dioxide has been removed can be discharged. In this state, when the exhaust gas exhausted from the heat recovery system generator 20 flows into the absorption tower 71, the carbon dioxide contained in the exhaust gas is absorbed by the lean absorbing liquid, and the exhaust gas from which the carbon dioxide has been removed is discharged. In the absorbing-liquid regeneration step Sre, the carbon dioxide capture system 50 brings about a state in which the carbon dioxide can be separated from the rich absorbing liquid that is an absorbing liquid that has absorbed the carbon dioxide. In this state, when the rich absorbing liquid flows into the regenerator 81, the carbon dioxide is separated from the rich aqueous solution, and the rich absorbing liquid becomes a lean absorbing liquid.

The first heating step Sh1 is included in the absorbing-liquid regeneration step Sre. In the first heating step Sh1, the absorbing-liquid regeneration device 80 brings about the first heating state in which the absorbing liquid flows through the first circulation line 86 and the absorbing liquid can be heated by the reboiler 89. In the first heating state, in the first shut-off valve 92a and the second shut-off valve 92b constituting the switcher 92, the first shut-off valve 92a is open and the second shut-off valve 92b is closed. In the first heating state, the absorbing liquid reserved in the liquid reservoir portion 81s in the regenerator container 81v flows into the reboiler 89 via the first circulation line 86. The absorbing liquid is heated by the steam from the heat recovery system generator 20 in the reboiler 89. The heated absorbing liquid returns to the inside of the regenerator 81 via the first circulation line 86 and the first shut-off valve 92a in the open state.

Next, the operation of the boiler plant until the gas turbine 11, the steam turbine 31, and the heat recovery system generator 20 are stopped from a state in which the gas turbine 11, the steam turbine 31, and the heat recovery system generator 20 are in steady operation will be described.

First, the fuel supply to the combustor 13 of the gas turbine 11 is stopped (fuel supply stop step Sfc), and the GT circuit breaker 42a is opened (GT circuit breaker opening step Stbo). The fuel supply stop step Sfc is executed when the plant control device 100 gives a closing instruction to the fuel regulating valve 17. When the fuel supply to the combustor 13 of the gas turbine 11 is stopped, the combustion gas is no longer generated in the combustor 13. For this reason, the flow rate of the exhaust gas flowing into the carbon dioxide capture system 50 from the gas turbine 11 via the heat recovery system generator 20 decreases gradually. The GT circuit breaker opening step Stbo is executed by the plant control device 100 giving an opening instruction to the GT circuit breaker 42a. When the GT circuit breaker closing step Stbc is executed, power is no longer supplied from the GT generator 19 to the external power system 48.

When the fuel supply to the combustor 13 is stopped, the flow rate of the steam generated by the heat recovery system generator 20 is maintained at the value during the steady operation of the gas turbine 11 for a predetermined time, but decreases gradually. Additionally, when the fuel supply to the combustor 13 is stopped, the temperature and pressure of the steam generated by the heat recovery system generator 20 are also maintained at the values during the steady operation of the gas turbine 11 for a predetermined time, but decrease gradually. For this reason, the steady operation of the steam turbine 31 cannot be performed. Thus, the ST circuit breaker 42b opens at the same time as the fuel supply to the combustor 13 of the gas turbine 11 is stopped or after a predetermined time after the fuel supply is stopped (ST circuit breaker opening step Ssbo). The ST circuit breaker opening step Ssbo is executed by the plant control device 100 giving an opening instruction to the ST circuit breaker 42b. When the ST circuit breaker closing step Ssbc is executed, power is no longer supplied from the ST generator 39 to the external power system 48.

When power is no longer supplied from the GT generator 19 or the ST generator 39 to the external power system 48, that is, when the GT generator 19 or the ST generator 39 no longer generates power, the chargeable step Sch ends.

When the GT generator 19 and the ST generator 39 no longer generate power and the steam generated by the heat recovery system generator 20 no longer satisfies the steam condition, the boiler plant is brought into a dischargeable state in which discharge is possible from the secondary battery 96 to the electric heater 91 (dischargeable step Sdch). The charging and discharging controller 97 brings the boiler plant into a dischargeable state when a state signal is received from the plant control device 100 to the effect that the GT generator 19 and the ST generator 39 no longer generate power and the steam generated by the heat recovery system generator 20 no longer satisfies the steam condition. In the dischargeable state, the charging and discharging controller 97 brings the secondary battery 96 and the heater drive circuit 91b of the electric heater 91 into an electrically connected state.

Additionally, when the steam generated by the heat recovery system generator 20 no longer satisfies the steam condition, the absorbing-liquid regeneration device 80 is brought into the second heating state in which the absorbing liquid flows through the second circulation line 87 and the absorbing liquid is heated by the heater 90 (second heating step Sh2). When the temperature detected by the temperature sensor 34 provided in the main steam line 32 becomes lower than a predetermined temperature Ts or when the pressure detected by the pressure sensor 35 provided in the main steam line 32 becomes lower than a predetermined pressure, the switching controller 93 determines that the steam condition is no longer satisfied and instructs the switcher 92 to bring about the second heating state. As a result, the second heating state is brought about in which, in the first shut-off valve 92a and the second shut-off valve 92b constituting the switcher 92, the first shut-off valve 92a is closed and the second shut-off valve 92b is opened. In the second heating state, the absorbing liquid reserved in the liquid reservoir portion 81s in the regenerator container 81v flows into the heater 90 via the second circulation line 87. The absorbing liquid may be heated by the electric heater 91 in the heater 90. The heated absorbing liquid returns to the inside of the regenerator container 81v via the second circulation line 87 and the second shut-off valve 92b in the open state.

In the second heating step Sh2, the second heating control step Sh2c is executed. In the second heating control step Sh2c, the second heating controller 95 controls the heating in the heater 90 depending on the absorbing liquid temperature detected by the temperature sensor 94. When the absorbing liquid temperature becomes lower than a predetermined first temperature (for example, 100° C.) Tab1, the second heating controller 95 gives an ON instruction to the heater drive circuit 91b. Additionally, when the absorbing liquid temperature becomes higher than a predetermined second temperature (for example, 120° C.) Tab2 that is higher than the first temperature Tab1, the second heating controller 95 gives an OFF instruction to the heater drive circuit 91b. When an ON instruction is input to the heater drive circuit 91b, the power discharged from the secondary battery 96 is supplied to the electric heater main body 91a, the electric heater main body 91a generates heat, and the absorbing liquid flowing through the second circulation line 87 is heated. Additionally, when an OFF instruction is input to the heater drive circuit 91b, power is no longer supplied from the secondary battery 96 to the electric heater main body 91a, and the electric heater main body 91a no longer generates heat. Thus, in the second heating step Sh2, the temperature of the absorbing liquid in the regenerator 81 fluctuates between the first temperature Tab1 and the second temperature Tab2.

For this reason, even if the heat recovery system generator 20 no longer generates steam, the temperature of the absorbing liquid in the regenerator 81 is maintained at substantially the first temperature Tab1 (for example, 100° C.) or higher.

When fuel is no longer supplied to the gas turbine 11, the gas turbine 11 is stopped, the heat recovery system generator 20 no longer generates steam, the steam turbine 31 is stopped, and then the fuel supply to the gas turbine 11 is started (fuel supply step Sfs), combustion gas is generated, and the rotation speed of the gas turbine rotor 15 increases gradually. When the rotation speed of the gas turbine rotor 15 reaches the rated rotation speed (for example, 3600 rpm), the GT circuit breaker 42a is closed (GT circuit breaker closing step Stbc), the GT generator 19 generates power, and the power in this case is supplied to the external power system 48.

As described above, the exhaust gas, which is the combustion gas exhausted from the gas turbine 11, flows into the heat recovery system generator 20. The heat recovery system generator 20 turns water into steam by using the heat of the exhaust gas. The temperature and pressure of the steam increase gradually. In this process, when the steam generated by the heat recovery system generator 20 satisfies the steam condition, the absorbing-liquid regeneration device 80 is brought into the first heating state in which the absorbing liquid flows through the first circulation line 86 and the reboiler 89 heats the absorbing liquid (first heating step Sh1). When the temperature detected by the temperature sensor 34 provided in the main steam line 32 becomes equal to or higher than a predetermined temperature Ts and when the pressure detected by the pressure sensor 35 provided in the main steam line 32 becomes equal to or higher than a predetermined pressure, the switching controller 93 determines that the steam condition is satisfied and instructs the switcher 92 to bring about the first heating state. As a result, the first heating state is brought about in which, in the first shut-off valve 92a and the second shut-off valve 92b constituting the switcher 92, the first shut-off valve 92a is opened and the second shut-off valve 92b is closed. In the first heating state, the absorbing liquid reserved in the liquid reservoir portion 81s in the regenerator container 81v flows into the reboiler 89 via the first circulation line 86. The absorbing liquid is heated by the steam from the heat recovery system generator 20 in the reboiler 89. The heated absorbing liquid returns to the inside of the regenerator container 81v via the first circulation line 86 and the first shut-off valve 92a in the open state.

Additionally, since the GT generator 19 generates power when the steam generated by the heat recovery system generator 20 satisfies the steam condition, the dischargeable step Sdch is switched to the chargeable step Sch from this point of time. Additionally, when the steam generated by the heat recovery system generator 20 satisfies the steam condition and the rotation speed of the steam turbine 31 reaches the rated rotation speed, the ST circuit breaker 42b is closed (ST circuit breaker closing step Ssbc), and power can be supplied from the ST generator 39 to the external power system 48.

When the heat recovery system generator 20 is started, exhaust gas flows into the carbon dioxide capture system 50 from the heat recovery system generator 20. In addition, the expression "when the heat recovery system generator 20 is started" is from the time when fuel supply to the gas turbine 11 is started, combustion gas is generated, exhaust gas passes through the heat recovery system generator 20, and the heat recovery system generator 20 starts to generate steam until the steam satisfies the steam condition. In the present embodiment, the absorption step Sab and the absorbing-liquid regeneration step Sre are executed even at the time of the start-up.

At the time of the start-up, the second heating step Sh2 is executed in the absorbing-liquid regeneration step Sre, and the temperature of the absorbing liquid in the regenerator 81 is maintained at substantially the first temperature Tab1 (for example, 100° C.) or higher. However, in most of a time zone during the start-up, the temperature of the absorbing liquid in the regenerator 81 is lower than an appropriate temperature (for example, 120° C.) for separating the carbon dioxide from the absorbing liquid. For this reason, in the regenerator 81, the ability to separate the carbon dioxide from the absorbing liquid decreases. That is, the amount of the carbon dioxide contained in the lean absorbing liquid sent from the regenerator 81 to the absorption tower 71 is larger than that when the steam turbine 31 and the heat recovery system generator 20 are in steady operation. Therefore, at the time of the start-up, the absorption rate of the carbon dioxide in the exhaust gas in the absorber 70 is lower than that when the steam turbine 31 and the heat recovery system generator 20 are in steady operation. However, in the present embodiment, since the absorber 70 absorbs the carbon dioxide in the exhaust gas into the absorbing liquid and executes the regeneration of the absorbing liquid that has absorbed the carbon dioxide even at the time of the start-up, the amount of discharge of the carbon dioxide can be suppressed when the heat recovery system generator 20 is started.

When the steam generated by the heat recovery system generator 20 satisfies the steam condition and the absorbing-liquid regeneration device 80 is brought into the first heating state, there is a high possibility that the temperature of the absorbing liquid in the regenerator 81 is lower than the appropriate temperature (for example, 120° C.) for separating the carbon dioxide. However, since the temperature of the absorbing liquid in the absorption tower 71 in this case is substantially equal to or higher than the first temperature Tab1 (for example, 100° C.), the temperature of the absorbing liquid in the absorption tower 71 can be set to the appropriate temperature (for example, 120° C.) for separating the carbon dioxide, within a short time after being switched to the first heating state. Thus, in the present embodiment, the amount of discharge of the carbon dioxide immediately after the absorbing-liquid regeneration device 80 is switched from the second heating state to the first heating state can be suppressed.

As described above, in the present embodiment, the carbon dioxide in the exhaust gas exhausted from the plant can be reduced even in the process of starting the boiler.

In the present embodiment, when the absorbing-liquid regeneration device 80 is in the second heating state, the absorbing liquid is not always heated by the heater 90. Therefore, the consumption of electric energy in the heater 90 can be suppressed.

In the chargeable state of the present embodiment, a part of the power from the GT generator 19, the ST generator 39, the solar power generation facility 46, and the wind power generation facility 49 may be charged in the secondary battery 96. The solar power generation facility 46 and the wind power generation facility 49 are carbon-free power generation facilities that generate power by using renewable energy. Additionally, the boiler plant of the present embodiment includes the gas turbine power generation facility 10 including the GT generator 19 and the steam turbine power generation facility 30 including the ST generator 39, but further includes the carbon dioxide capture system 50. Thus, the carbon dioxide in the exhaust gas exhausted from the boiler plant is little. Thus, in the present embodiment, the discharge of the carbon dioxide when generating the power for charging the secondary battery 96 can be suppressed.

MODIFICATION EXAMPLE

The boiler of the present embodiment is the heat recovery system generator 20 that generates steam with the heat of the exhaust gas from the gas turbine 11. However, the boiler may be a general boiler having a combustion chamber for combusting fossil fuel.

The steam turbine 31 may include a plurality of steam turbines 31 in which the pressures of inflowing steam are different from each other.

In the present embodiment, the GT generator 19 and the ST generator 39 are independent generators. However, in a case where the gas turbine rotor 15 and the steam turbine rotor are coupled to each other, one generator may be connected to the rotors, and the generator may serve as both a generator for the gas turbine 11 and a generator for the steam turbine 31.

The heater 90 of the present embodiment has the electric heater 91, and the energy for heating the absorbing liquid with the heater 90 is electric energy. However, the energy for heating the absorbing liquid with the heater 90 may not be the electric energy, and may be, for example, the thermal energy of steam. However, in this case, a boiler or the like that generates steam independently of the heat recovery system generator 20 is required.

In the second heating control step Sh2c of the present embodiment, the temperature of the absorbing liquid in the regenerator 81 is controlled to fluctuate between the first temperature Tab1 and the second temperature Tab2. However, in the second heating control step Sh2c, the temperature of the absorbing liquid in the regenerator 81 may be controlled to be, for example, a third temperature between the first temperature Tab1 and the second temperature Tab2.

The first circulation line 86 and the second circulation line 87 in the present embodiment share a part with each other. However, the first circulation line 86 and the second circulation line 87 may be completely independent of each other.

The switching controller 93 and the second heating controller 95 in the present embodiment are present separately from the plant control device 100. However, the switching controller 93 and the second heating controller 95 may be incorporated in the plant control device 100.

In the present embodiment, when the GT generator 19 or the ST generator 39 no longer generates power, the chargeable step Sch ends. However, if another power generation facility in the plant or a power generation facility connected to the external power system 48 is in operation and there is surplus power, the chargeable step Sch may not be ended. That is, in a case where there is surplus power, the chargeable step Sch may be continued.

In the present embodiment, when the GT generator 19 and the ST generator 39 no longer generate power and the steam generated by the heat recovery system generator 20 no longer satisfies the steam condition, the boiler plant is brought into the dischargeable state (dischargeable step Sdch). For this reason, in the present embodiment, the chargeable step Sch and the dischargeable step Sdch are not executed in the same time zone. However, if the secondary battery 96 has a function capable of simultaneously performing charging and discharging, the execution time zone of the chargeable step Sch and the execution time zone of the dischargeable step Sdch may partially overlap each other. In this case, the start timing of the dischargeable step Sdch may coincide with the end timing of the chargeable step Sch in the present embodiment, or may be earlier than the end timing of the chargeable step Sch in the present embodiment.

Additional Notes

The boiler plant in the above embodiment is grasped as follows, for example.

(1) A boiler plant in a first aspect includes a boiler 20 that generates steam with heat of a combustion gas generated through combustion of a fossil fuel F, and a carbon dioxide capture system 50 that removes carbon dioxide contained in an exhaust gas exhausted from the boiler 20.

The carbon dioxide capture system 50 has an absorbing-liquid regeneration device 80 that separates the carbon dioxide from an absorbing liquid that has absorbed the carbon dioxide, and an absorber 70 that allows the exhaust gas from the boiler 20 to flow thereinto, absorbs the carbon dioxide in the exhaust gas in the absorbing liquid from the absorbing-liquid regeneration device, and discharges the exhaust gas from which the carbon dioxide has been removed. The absorbing-liquid regeneration device 80 has a regenerator 81 that allows the absorbing liquid, which has absorbed the carbon dioxide in the absorber 70, to flow thereinto, separates the carbon dioxide from the absorbing liquid in a high-temperature environment to discharge the carbon dioxide, and returns the absorbing liquid from which the carbon dioxide has been separated to the absorber 70, a first circulation line 86 that takes out the absorbing liquid from an inside of the regenerator 81 and then returns the taken-out absorbing liquid to the inside of the regenerator 81, a second circulation line 87 that takes out the absorbing liquid from the inside of the regenerator 81 and then returns the taken-out absorbing liquid to the inside of the regenerator 81, a heat exchanger 89 that is provided in the first circulation line 86 to heat the absorbing liquid by exchanging heat between the absorbing liquid flowing through the first circulation line 86 and the steam from the boiler 20, a heater 90 that is provided in the second circulation line 87 to heat the absorbing liquid flowing through the second circulation line 87, and a switcher 92 that switches between a first heating state in which the absorbing liquid flows through the first circulation line 86 and a second heating state in which the absorbing liquid flows through the second circulation line 87.

In the present aspect, when the steam condition that the temperature of the steam sent from the boiler 20 to the heat exchanger 89 is equal to or higher than a predetermined temperature and the pressure of the steam is equal to or higher than a predetermined pressure is satisfied, the absorbing-liquid regeneration device 80 is brought into the first heating state. In the first heating state, the absorbing liquid is heated with the steam from the boiler 20 in the heat exchanger 89. As the absorbing liquid is heated, the inside of the regenerator 81 becomes a high-temperature environment, and the carbon dioxide is separated from the absorbing liquid. The absorbing liquid from which the carbon dioxide has been separated is supplied to the absorber 70. In the absorber 70, the carbon dioxide in the exhaust gas from the heat recovery system generator 20 is absorbed by the absorbing liquid, and the exhaust gas from which the carbon dioxide has been removed is discharged. Thus, in the present aspect, when the steam from the boiler 20 satisfies the steam condition, the carbon dioxide contained in the exhaust gas exhausted from the plant can be reduced.

In the present aspect, when the steam sent from the boiler 20 to the heat exchanger 89 does not satisfy the steam condition, the absorbing-liquid regeneration device 80 is brought into the second heating state. In the second heating state, the absorbing liquid is heated by the heater 90. As the absorbing liquid is heated, the inside of the regenerator 81 becomes a high-temperature environment, and the carbon dioxide is separated from the absorbing liquid. The absorbing liquid from which the carbon dioxide has been separated is supplied to the absorber 70. In the absorber 70, the carbon dioxide in the exhaust gas from the boiler 20 is absorbed by the absorbing liquid, and the exhaust gas from which the carbon dioxide has been removed is discharged. Thus, in the present aspect, even when the steam from the boiler 20 does not satisfy the steam condition, the carbon dioxide contained in the exhaust gas exhausted from the plant can be reduced. Additionally, in the present aspect, even when the second heating state is switched to the first heating state, the temperature of the absorbing liquid in the regenerator 81 is equal to or higher than the predetermined temperature. Therefore, even immediately after the second heating state is switched to the first heating state, the temperature of the absorbing liquid in the regenerator 81 can be raised to a target temperature within a short time. For this reason, in the present aspect, it is possible to reduce the amount of the carbon dioxide contained in the exhaust gas exhausted from the plant even immediately after the second heating state is switched to the first heating state.

(2) In the boiler plant in a second aspect according to the boiler plant of the first aspect, the absorbing-liquid regeneration device 80 has a switching controller 93 that instructs the switcher 92 to bring about the first heating state when a steam condition that a temperature of the steam sent from the boiler 20 to the heat exchanger 89 is equal to or higher than a predetermined temperature and a pressure of the steam is equal to or higher than a predetermined pressure is satisfied, and instructs the switcher 92 to bring about the second heating state when the steam condition is not satisfied.

In the present aspect, when the steam sent from the boiler 20 to the heat exchanger 89 satisfies the steam condition, the first heating state can be automatically brought about. Additionally, in the present aspect, when the steam sent from the boiler 20 to the heat exchanger 89 does not satisfy the steam condition, the second heating state can be automatically brought about.

(3) In the boiler plant in a third aspect according to the boiler plant of the second aspect, the absorbing-liquid regeneration device 80 has a temperature sensor 94 that detects a temperature of the absorbing liquid reserved in the regenerator 81, and a second heating controller 95 that heats the absorbing liquid by the heater 90 when the temperature detected by the temperature sensor 94 becomes lower than a predetermined temperature in the second heating state.

In the present aspect, even in the second heating state, the absorbing liquid is not always heated by the heater 90. Therefore, the consumption of thermal energy in the heater 90 can be suppressed.

(4) In the boiler plant in a fourth aspect according to in the boiler plant of the second aspect or the third aspect, the absorbing-liquid regeneration device 80 has a secondary battery 96, and a charging and discharging controller 97 that controls charging and discharging of the secondary battery 96.

The heater 90 has an electric heater 91 that generates heat by supplying power from the secondary battery 96.

In the present aspect, the electric heater 91 can be heated with the power charged in the secondary battery 96.

(5) In the boiler plant in a fifth aspect according to the boiler plant of the fourth aspect, the charging and discharging controller 97 brings about a chargeable state in which a power generation facility and the secondary battery 96 are electrically connected to each other such that power is chargeable from the power generation facility to the secondary battery 96 when the power generation facility is generating power, and brings about a dischargeable state in which the secondary battery 96 and the electric heater 91 are electrically connected to each other such that power is dischargeable from the secondary battery 96 to the electric heater 91 when the steam condition is not satisfied.

In the present aspect, when the power generation facility is generating power, if the secondary battery 96 is not in a fully charged state, the power from the power generation facility can be charged in the secondary battery 96. Additionally, in the present aspect, when the steam sent from the boiler 20 to the heat exchanger 89 does not satisfy the steam condition, the electric heater 91 can be heated with the power charged in the secondary battery 96.

(6) The boiler plant in a sixth aspect according to the boiler plant of the fifth aspect further includes a steam turbine 31 that is driven with the steam from the boiler 20, and a generator 39 that generates power by driving the steam turbine 31.

The power generation facility includes the generator 39.

In the present aspect, when the generator 39 driven by the steam turbine 31 is generating power, the power from the generator 39 can be charged in the secondary battery 96.

(7) In the boiler plant in a seventh aspect according to the boiler plant of the fifth aspect or the sixth aspect, the power generation facility includes a carbon-free power generation facility, and the carbon-free power generation facility is a facility that discharges carbon dioxide having a concentration lower than the carbon dioxide concentration in the exhaust gas from a facility that generates power by using the combustion gas generated through the combustion of the fossil fuel, or a facility that does not discharge the carbon dioxide during power generation.

In the present aspect, the discharge of the carbon dioxide when generating the power for charging the secondary battery 96 can be suppressed.

(8) The boiler plant in an eighth aspect according to the boiler plant of any one of the first aspect to the seventh aspect further includes a gas turbine 11 that is driven with the combustion gas generated through the combustion of the fossil fuel F.

The boiler 20 is a heat recovery system generator that generates steam with heat of the combustion gas exhausted from the gas turbine 11.

The carbon dioxide removal method in the above embodiment is grasped as follows, for example. (9) A carbon dioxide removal method in a ninth aspect executes an absorbing-liquid regeneration step Sre in which carbon dioxide is separable from an absorbing liquid that has absorbed the carbon dioxide, and an absorption step Sab in which an exhaust gas from a boiler 20 flows in, the carbon dioxide in the exhaust gas is absorbed in the absorbing liquid processed in the absorbing-liquid regeneration step Sre, and the exhaust gas from which the carbon dioxide has been removed is capable of being discharged.

The absorbing-liquid regeneration step Sre is executed by an absorbing-liquid regeneration device 80. The absorbing-liquid regeneration device 80 has a regenerator 81 that allows the absorbing liquid, which has absorbed the carbon dioxide through an execution of the absorption step Sab, to flow thereinto, separates the carbon dioxide from the absorbing liquid in a high-temperature environment to discharge the carbon dioxide, and causes the absorbing liquid from which the carbon dioxide has been separated to be used in the absorption step Sab, a first circulation line 86 that takes out the absorbing liquid from an inside of the regenerator 81 and then returns the taken-out absorbing liquid to the inside of the regenerator 81, a second circulation line 87 that takes out the absorbing liquid from the inside of the regenerator 81 and then returns the taken-out absorbing liquid to the inside of the regenerator 81, a heat exchanger 89 that is provided in the first circulation line 86 to heat the absorbing liquid by exchanging heat between the absorbing liquid flowing through the first circulation line 86 and steam from the boiler 20, and a heater 90 that is provided in the second circulation line 87 to heat the absorbing liquid flowing through the second circulation line 87. The absorbing-liquid regeneration step Sre includes a first heating step Sh1 in which the absorbing liquid flows through the first circulation line 86 such that the absorbing liquid is heatable by the heat exchanger 89, and a second heating step Sh2 in which the absorbing liquid flows through the second circulation line 87 such that the absorbing liquid is heatable by the heater 90.

(10) In the carbon dioxide removal method in a tenth aspect according to the carbon dioxide removal method of the ninth aspect, in the absorbing-liquid regeneration step Sre, the first heating step Sh1 is executed when a steam condition that a temperature of the steam sent from the boiler 20 to the heat exchanger 89 is equal to or higher than a predetermined temperature and a pressure of the steam is equal to or higher than a predetermined pressure is satisfied, and the second heating step Sh2 is executed when the steam condition is not satisfied.

(11) In the carbon dioxide removal method in an eleventh aspect according to the carbon dioxide removal method of the tenth aspect, the second heating step Sh2 includes a second heating control step Sh2c in which the absorbing liquid is heated by the heater 90 when a temperature of the absorbing liquid reserved in the regenerator 81 becomes lower than a predetermined temperature.

(12) In the carbon dioxide removal method in a twelfth aspect according to the carbon dioxide removal method of the tenth aspect or the eleventh aspect, the absorbing-liquid regeneration device 80 has a secondary battery 96, and the heater 90 has an electric heater 91 that generates heat by supplying power from the secondary battery 96.

The absorbing-liquid regeneration step Sre includes a chargeable step Sch in which the secondary battery 96 is chargeable and a dischargeable step Sdch in which the secondary battery 96 is dischargeable to the electric heater 91.

(13) In the carbon dioxide removal method in a thirteenth aspect according to the carbon dioxide removal method of the twelfth aspect, in the chargeable step Sch, a power generation facility and the secondary battery 96 are electrically connected to each other such that power is chargeable from the power generation facility to the secondary battery 96 when the power generation facility is generating power.

Additionally, in the dischargeable step Sdch, the secondary battery 96 and the electric heater 91 are electrically connected to each other such that power is dischargeable from the secondary battery 96 to the electric heater 91 when the steam condition is not satisfied.

(14) In the carbon dioxide removal method in a fourteenth aspect according to the carbon dioxide removal method of the thirteenth aspect, the power generation facility includes a carbon-free power generation facility.

The carbon-free power generation facility is a facility that discharges carbon dioxide having a concentration lower than the carbon dioxide concentration in the exhaust gas from a facility that generates power by using the combustion gas generated through the combustion of the fossil fuel, or a facility that does not discharge the carbon dioxide during power generation.

(15) In the carbon dioxide removal method in a fifteenth aspect according to the carbon dioxide removal method of the fourteenth aspect, the carbon-free power generation facility includes a facility that generates power by using renewable energy.

INDUSTRIAL APPLICABILITY

According to one aspect of the present invention, the carbon dioxide in the exhaust gas exhausted from the plant can be reduced even in the process of starting the boiler.

REFERENCE SIGNS LIST

10 gas turbine equipment (or gas turbine power generation facility)
11 gas turbine
12 air compressor
13 combustor
14 turbine
15 gas turbine rotor
16 fuel line
17 fuel regulating valve
19 GT generator
20 heat recovery system generator (or boiler)
30 steam turbine equipment (or steam turbine power generation facility)
31 steam turbine 32 main steam line
33 steam regulating valve
34 temperature sensor
35 pressure sensor
36 condenser
37 supply water line
38 heating steam line
39 ST generator
40 power system facility
41a GT power system
41b ST power system
42a GT circuit breaker
42b ST circuit breaker
43a GT transformer
43b ST transformer
44 AC/DC converter
45 direct-current power system
46 solar power generation facility
48 external power system
49 wind power generation facility
50 carbon dioxide capture system
51 gas booster
52 exhaust gas recirculation line
60 exhaust gas cooling device
61 cooling tower
61v cooling tower container
61p filling material
62 water circulation line
63 water circulation pump
64 water cooler
65 low-temperature exhaust gas line
70 absorber
71 absorption tower
71v absorption tower container
71pa lower filling material
71pb upper filling material
71da lower demister
71db upper demister
71t tray
71s water reservoir portion
72 exhaust line
73 lean absorbing-liquid line
74 lean-rich heat exchanger
75 lean absorbing-liquid pump
76 lean absorbing-liquid cooler
77 lean absorbing-liquid regulating valve
78 rinse water circulation line
79p rinse water circulation pump
79r rinse water cooler
80 absorbing-liquid regeneration device
81 regenerator
81v regenerator container
81p filling material
81t tray
81s liquid reservoir portion
82 carbon dioxide recovery line
82r cooler
82t moisture separation tank
82c carbon dioxide compressor
82p water pump
82w moisture recovery line
83 rich absorbing-liquid line
84 rich absorbing-liquid pump
85 rich absorbing-liquid regulating valve
86 First circulation line
86a inflow-side sharing portion
86b outflow-side sharing portion
86c intermediate portion
87 second circulation line
87c intermediate portion
89 reboiler (heat exchanger)
90 heater
90v heating container
91 electric heater
91a electric heater main body
91b heater drive circuit
92 switcher
92a first shut-off valve
92b second shut-off valve
93 switching controller
94 temperature sensor
95 second heating controller
96 secondary battery
97 charging and discharging controller
98 discharge system
100 plant control device

The invention claimed is:

1. A boiler plant comprising:
a boiler configured to generate steam with heat of a combustion gas generated through combustion of a fossil fuel; and
a carbon dioxide capture system configured to remove carbon dioxide contained in an exhaust gas exhausted from the boiler,
wherein the carbon dioxide capture system includes:
an absorbing-liquid regeneration device configured to separate the carbon dioxide from an absorbing liquid that has absorbed the carbon dioxide, and
an absorber configured to allow the exhaust gas from the boiler to flow thereinto, absorb the carbon dioxide in the exhaust gas in the absorbing liquid from the absorbing-liquid regeneration device, and discharge the exhaust gas from which the carbon dioxide has been removed, and
wherein the absorbing-liquid regeneration device includes:
a regenerator configured to allow the absorbing liquid, which has absorbed the carbon dioxide in the absorber, to flow thereinto, separate the carbon dioxide from the absorbing liquid in a high-temperature environment to discharge the carbon dioxide, and return the absorbing liquid from which the carbon dioxide has been separated to the absorber,
a first circulation line configured to take out the absorbing liquid from an inside of the regenerator and then return the taken-out absorbing liquid to the inside of the regenerator,
a second circulation line configured to take out the absorbing liquid from the inside of the regenerator and then return the taken-out absorbing liquid to the inside of the regenerator,
a heat exchanger in the first circulation line to heat the absorbing liquid by exchanging heat between the absorbing liquid flowing through the first circulation line and the steam from the boiler,
a heater in the second circulation line to heat the absorbing liquid flowing through the second circulation line, and
a switcher configured to switch between a first heating state in which the absorbing liquid flows through the first circulation line and a second heating state in which the absorbing liquid flows through the second circulation line.

2. The boiler plant according to claim 1, wherein the absorbing-liquid regeneration device includes a switching controller configured to instruct the switcher to bring about the first heating state when a steam condition that a temperature of the steam sent from the boiler to the heat exchanger is equal to or higher than a predetermined temperature and a pressure of the steam is equal to or higher than a predetermined pressure is satisfied, and to instruct the switcher to bring about the second heating state when the steam condition is not satisfied.

3. The boiler plant according to claim 2, wherein the absorbing-liquid regeneration device includes:
 a temperature sensor configured to detect a temperature of the absorbing liquid reserved in the regenerator, and
 a second heating controller configured to heat the absorbing liquid by the heater when the temperature detected by the temperature sensor becomes lower than a predetermined temperature in the second heating state.

4. The boiler plant according to claim 2,
 wherein the absorbing-liquid regeneration device includes a secondary battery, and a charging and discharging controller configured to control charging and discharging of the secondary battery, and
 wherein the heater has an electric heater configured to generate heat by supplying power from the secondary battery.

5. The boiler plant according to claim 4, wherein the charging and discharging controller is configured to bring about a chargeable state in which a power generation facility and the secondary battery are electrically connected to each other such that power is chargeable from the power generation facility to the secondary battery when the power generation facility is generating power, and to bring about a dischargeable state in which the secondary battery and the electric heater are electrically connected to each other such that power is dischargeable from the secondary battery to the electric heater when the steam condition is not satisfied.

6. The boiler plant according to claim 5, further comprising:
 a steam turbine to be driven with the steam from the boiler; and
 a generator configured to generate power by driving the steam turbine, wherein the power generation facility includes the generator.

7. The boiler plant according to claim 5,
 wherein the power generation facility includes a carbon-free power generation facility, and
 wherein the carbon-free power generation facility is configured to discharge carbon dioxide having a concentration lower than a carbon dioxide concentration in exhaust gas from a facility configured to generate power by using the combustion gas generated through the combustion of the fossil fuel, or the carbon-free power generation facility is is configured to not exhaust carbon dioxide during power generation.

8. The boiler plant according to claim 1, further comprising:
 a gas turbine to be driven with the combustion gas generated through the combustion of the fossil fuel,
 wherein the boiler is a heat recovery system generator configured to generate steam with heat of the combustion gas exhausted from the gas turbine.

9. A carbon dioxide removal method comprising:
an absorbing-liquid regeneration step in which carbon dioxide is separated from an absorbing liquid that has absorbed the carbon dioxide, and
an absorption step in which the carbon dioxide in exhaust gas from a boiler is absorbed in the absorbing liquid processed in the absorbing-liquid regeneration step, and the exhaust gas from which the carbon dioxide has been removed is capable of being discharged,
wherein the absorbing-liquid regeneration step is executed by an absorbing-liquid regeneration device, the absorbing-liquid regeneration device including:
 a regenerator configured to allow the absorbing liquid, which has absorbed the carbon dioxide via the absorption step, to flow thereinto, to separate the carbon dioxide from the absorbing liquid in a high-temperature environment to exhaust the carbon dioxide, and to cause the absorbing liquid from which the carbon dioxide has been separated to be used in the absorption step,
 a first circulation line configured to take out the absorbing liquid from an inside of the regenerator and then return the taken-out absorbing liquid to the inside of the regenerator,
 a second circulation line configured to take out the absorbing liquid from the inside of the regenerator and then return the taken-out absorbing liquid to the inside of the regenerator,
 a heat exchanger in the first circulation line to heat the absorbing liquid by exchanging heat between the absorbing liquid flowing through the first circulation line and steam from the boiler, and
 a heater in the second circulation line to heat the absorbing liquid flowing through the second circulation line,
wherein the absorbing-liquid regeneration step includes:
 a first heating step in which the absorbing liquid flows through the first circulation line such that the absorbing liquid is heated by the heat exchanger, and
 a second heating step in which the absorbing liquid flows through the second circulation line such that the absorbing liquid is heated by the heater, and
wherein, in the absorbing-liquid regeneration step, the first heating step and the second heating step are performed by switching heating states between a first heating state, in which the absorbing liquid flows through the first circulation line, and a second heating state, in which the absorbing liquid flows through the second circulation line.

10. A carbon dioxide removal method comprising:
an absorbing-liquid regeneration step in which carbon dioxide is separated from an absorbing liquid that has absorbed the carbon dioxide, and
an absorption step in which the carbon dioxide in exhaust gas from a boiler is absorbed in the absorbing liquid processed in the absorbing-liquid regeneration step, and the exhaust gas from which the carbon dioxide has been removed is capable of being discharged,
wherein the absorbing-liquid regeneration step is executed by an absorbing-liquid regeneration device, the absorbing-liquid regeneration device including:
 a regenerator configured to allow the absorbing liquid, which has absorbed the carbon dioxide via the absorption step, to flow thereinto, to separate the carbon dioxide from the absorbing liquid in a high-temperature environment to exhaust the carbon dioxide, and to cause the absorbing liquid from which the carbon dioxide has been separated to be used in the absorption step, a first circulation line configured to take out the absorbing liquid from an inside of the regenerator and then return the taken-out absorbing liquid to the inside of the regenerator, a second circulation line configured to take out the absorbing liquid from the inside of the regenerator and then return the taken-out absorbing liquid to the inside of the regenerator, a heat exchanger in the first circulation line to heat the absorbing liquid by exchanging heat between the absorbing liquid flowing through the first circulation line and steam from the boiler, and a heater in the second circulation line to heat the absorbing liquid flowing through the second circulation line, and wherein the absorbing-liquid regeneration step includes:

a first heating step in which the absorbing liquid flows through the first circulation line such that the absorbing liquid is heated by the heat exchanger, and a second heating step in which the absorbing liquid flows through the second circulation line such that the absorbing liquid is heated by the heater, and wherein, in the absorbing-liquid regeneration step, the first heating step is executed when a steam condition is satisfied, the steam condition being satisfied when a temperature of the steam sent from the boiler to the heat exchanger is equal to or higher than a predetermined temperature and a pressure of the steam is equal to or higher than a predetermined pressure, and the second heating step is executed when the steam condition is not satisfied.

11. The carbon dioxide removal method according to claim 10, wherein the second heating step includes a second heating control step in which the absorbing liquid is heated by the heater when a temperature of the absorbing liquid reserved in the regenerator becomes lower than a predetermined temperature.

12. The carbon dioxide removal method according to claim 10, wherein:

the absorbing-liquid regeneration device includes a secondary battery, the heater has an electric heater configured to generate heat by supplying power from the secondary battery, and the absorbing-liquid regeneration step includes:

a chargeable step in which the secondary battery is chargeable, and a dischargeable step in which the secondary battery is dischargeable to the electric heater.

13. The carbon dioxide removal method according to claim 12, wherein:

in the chargeable step, a power generation facility and the secondary battery are electrically connected to each other such that power is chargeable from the power generation facility to the secondary battery when the power generation facility is generating power, and in the dischargeable step, the secondary battery and the electric heater are electrically connected to each other such that power is dischargeable from the secondary battery to the electric heater when the steam condition is not satisfied.

14. The carbon dioxide removal method according to claim 13, wherein:

the power generation facility includes a carbon-free power generation facility, and the carbon-free power generation facility is configured to discharge carbon dioxide having a concentration lower than a carbon dioxide concentration in the exhaust gas from a facility configured to generate power by using a combustion gas generated through a combustion of a fossil fuel, or the carbon-free power generation facility is configured to not discharge the carbon dioxide during power generation.

15. The carbon dioxide removal method according to claim 14, wherein the carbon-free power generation facility is configured to generate power by using renewable energy.

* * * * *

UNITED STATES PATENT AND TRADEMARK OFFICE
CERTIFICATE OF CORRECTION

| | |
|---|---|
| PATENT NO. | : 11,833,467 B2 |
| APPLICATION NO. | : 17/779430 |
| DATED | : December 5, 2023 |
| INVENTOR(S) | : Atsushi Tsutsumi |

It is certified that error appears in the above-identified patent and that said Letters Patent is hereby corrected as shown below:

On the Title Page

Item (73) "Assignees", please remove the party -- Mitsubishi Heavy Industries Engineering, Ltd., Kanagawa (JP) --.

Signed and Sealed this
Third Day of September, 2024

Katherine Kelly Vidal
*Director of the United States Patent and Trademark Office*